(12) United States Patent
Chou

(10) Patent No.: US 7,319,585 B2
(45) Date of Patent: Jan. 15, 2008

(54) FIXING STRUCTURE FOR DETACHABLE ELECTRONIC ASSEMBLY AND ELECTRONIC APPARATUS

(75) Inventor: Chuan-Chang Chou, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 449 days.

(21) Appl. No.: 11/119,710

(22) Filed: May 3, 2005

(65) Prior Publication Data

US 2005/0264991 A1 Dec. 1, 2005

(30) Foreign Application Priority Data

May 28, 2004 (TW) ............................... 93115400 A

(51) Int. Cl.
*G06F 1/16* (2006.01)
(52) U.S. Cl. .................... 361/685; 312/223.1
(58) Field of Classification Search ........ 361/679–686, 361/724–727; 312/223.1, 223.2; 369/75.11–82
See application file for complete search history.

(56) References Cited

U.S. PATENT DOCUMENTS

| | | | | |
|---|---|---|---|---|
| 5,222,897 A | * | 6/1993 | Collins et al. | 439/157 |
| 5,325,264 A | * | 6/1994 | Kirk et al. | 361/685 |
| 5,481,431 A | * | 1/1996 | Siahpolo et al. | 361/685 |
| 5,510,955 A | * | 4/1996 | Taesang | 361/685 |
| 6,275,377 B1 | * | 8/2001 | Liu et al. | 361/685 |
| 6,459,572 B1 | * | 10/2002 | Huang et al. | 361/685 |
| 6,515,855 B1 | * | 2/2003 | Removedummy | 361/685 |

* cited by examiner

*Primary Examiner*—Jayprakash Gandhi
*Assistant Examiner*—Anthony Q Edwards
(74) *Attorney, Agent, or Firm*—Birch, Stewart, Kolasch & Birch, LLP

(57) ABSTRACT

A fixing structure is for a detachable electronic assembly. The detachable electronic assembly has at least one first hole. The fixing structure includes a housing, a first movable member, and a second movable member. In this case, the housing has at least one guiding bar, at least one fist connecting portion, and a first opening opposite to the first hole. The first movable member has a second opening and a second connecting portion. The first movable member is pivoted on the housing, and the second connecting portion connects with the first connecting portion. The second movable member has a third opening and a protrusion. The second movable member moves along the guiding bar caused by the rotation of the first movable member, so that the protrusion is inserted into the first opening and the first hole. An apparatus having a fixing structure is also provided.

20 Claims, 5 Drawing Sheets

FIXING STRUCTURE FOR DETACHABLE ELECTRONIC ASSEMBLY AND ELECTRONIC APPARATUS

BACKGROUND OF THE INVENTION

1. Field of Invention

The invention relates to a fixing structure and an electronic apparatus and, in particular, to a screw-free fixing structure for an electronic assembly.

2. Related Art

In the age of information explosion, a hard disk drive may be the most important secondary storage device in a computer system. A hard disk drive provides a storage space that is cheap, fast and large capacity, and can store operating system, application programs, and user data.

Traditionally, a detachable hard disk drive is fixed in a frame in advance. This frame may be a part of the housing of a computer system. As shown in FIG. 1, a traditional detachable hard disk drive 11 is provided in a frame 12. The lateral sides of the frame 12 has a plurality of screw holes 121, which corresponds to the fixing holes 111 on the lateral sides of the hard disk drive 11, so that the frame 12 and the hard disk drive 11 can be assembled by screws 13.

However, one needs many screws 13 to assemble the hard disk drive 11 mentioned above. This raises the assembly time required, slows down the production speed, and adds additional costs to purchase the screws, which raises the production costs. Furthermore, the thread of the screws tends to be damaged when excess forces are applied to the screws. This results in the replacement of the screws, which wastes resources and further raises the production costs.

Moreover, when replacing, maintaining or expanding the hard disk drive 11, professional tools such as screwdrivers are required. Since the size of a screwdriver is not big, it is easy for one to lose the screwdriver, which results in the idle of the assembly jobs.

It is therefore an important subject to provide a fixing structure for a detachable electronic assembly and an electronic apparatus, which can solve the above-mentioned problems.

SUMMARY OF THE INVENTION

In view of the above, the invention is to provide a screw-free fixing structure to fix a detachable electronic assembly, and an electronic apparatus having such a fixing structure.

To achieve the above, a fixing structure for fixing a detachable electronic assembly according to the invention includes a housing, a first movable member and a second movable member. The detachable electronic assembly has at least one first hole. The housing has at least one guiding bar, at least one first connecting portion, and a first opening corresponding to the first hole. The first movable member has a second opening and a second connecting portion, wherein the first movable member is pivotally connected with the housing, and the second connecting portion is locked with the first connecting portion. The second movable member has a third opening and a protrusion, wherein a part of the second movable member passes through the second opening, and the guiding bar passes through the third opening, the second movable member moves along the guide bar by the rotation of the first movable member so that the protrusion is inserted into the first opening and the first hole.

The apparatus having the fixing structure according to the invention has a detachable electronic assembly, a housing, a first movable member, and a second movable member. The detachable electronic assembly has at least one first hole. The housing has at least one guiding bar, at least one first connecting portion, and a first opening corresponding to the first hole. The first movable member has a second opening and a second connecting portion, wherein the first movable member is pivotally connected with the housing, and the second connecting portion is locked with the first connecting portion. The second movable member has a third opening and a protrusion, wherein a part of the second movable member passes through the second opening, and the guiding bar passes through the third opening, the second movable member moves along the guide bar by the rotation of the first movable member so that the protrusion is inserted into the first opening and the first hole.

As mentioned above, the fixing structure of the invention moves the second movable member by rotating the first movable member. When the first movable member rotates, the protrusion on the second movable member fixes the electronic assembly to the housing or releases the electronic assembly from the housing. Since no screw is needed, the assembly time and material costs are both reduced. Furthermore, since the second connecting portion on the first movable member is used to connect with the first connecting portion on the housing, the fixing and releasing operation of the user is easier and more convenient. Furthermore, the first movable member and the second movable member are connected directly or indirectly, or are limited to move on the housing, therefore the user does not have to worry about not being able to fix detachable electronic assembly due to part missing.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

First, please refer to FIG. 2 to FIG. 7, which show a fixing structure for a detachable electronic assembly according to a preferred embodiment of the invention.

Figure 1:
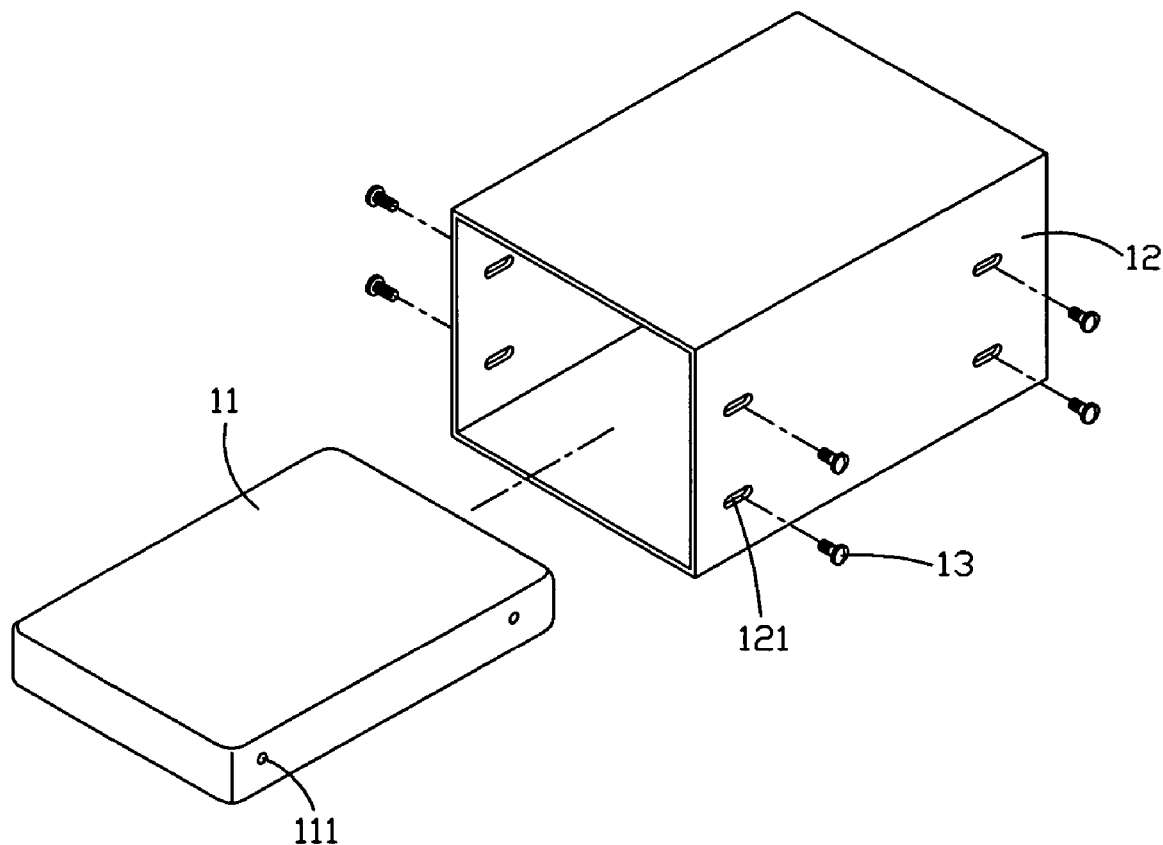
FIG. 1 is a schematic diagram showing the conventional hard disk drive.
Figure 2:
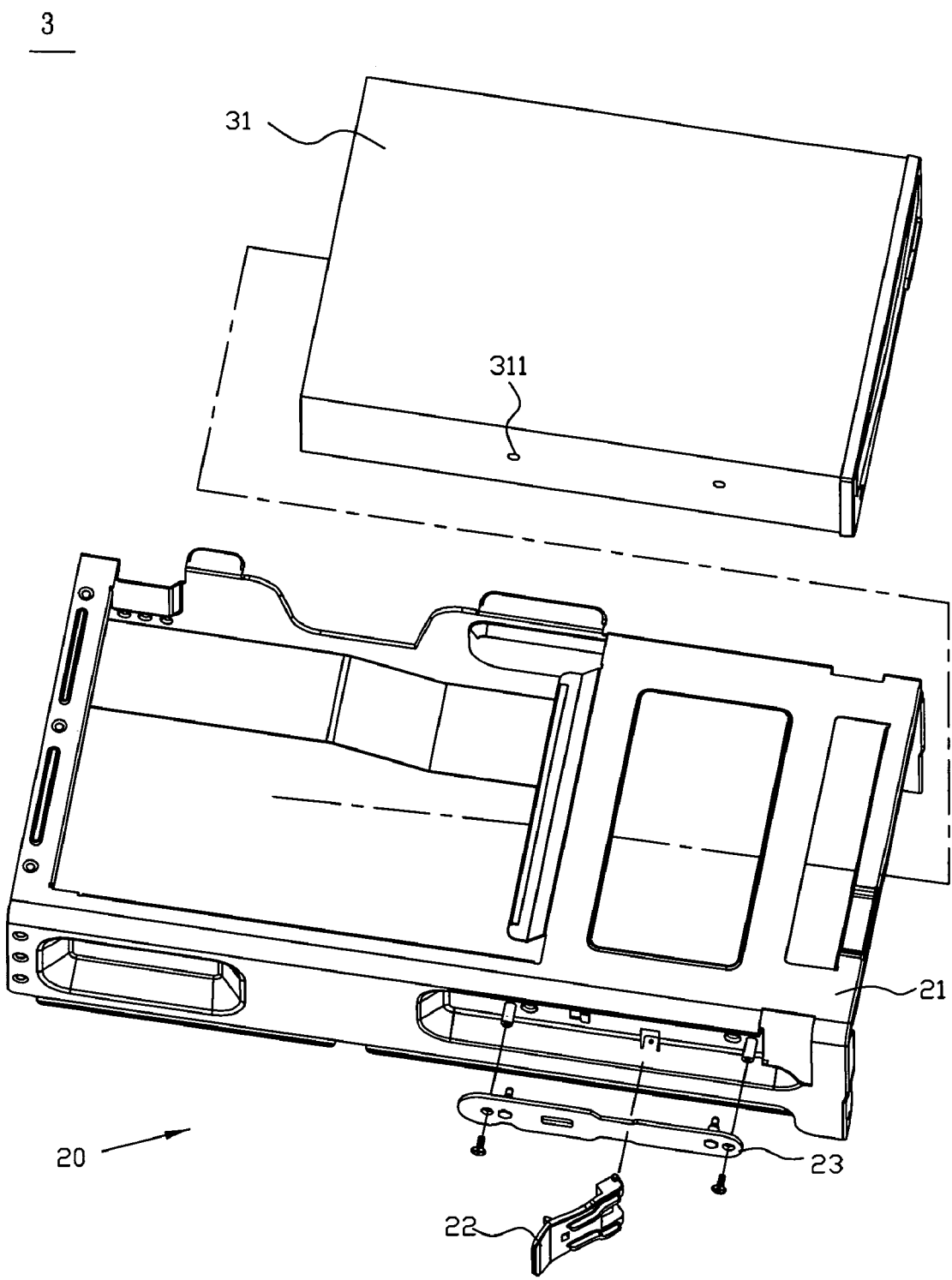
FIG. 2 is a schematic diagram showing a fixing structure for a detachable electronic assembly and an apparatus according to a preferred embodiment of the invention.

As shown in FIG. 2, a fixing structure 20 for a detachable electronic assembly is used to fix a detachable electronic assembly 31. The detachable electronic assembly 31 has at least one first hole 311, and can be a hard disk drive, an optical disk drive, or any computer system component. In the present embodiment, the detachable electronic assembly 31 is a hard disk drive.

The fixing structure 20 includes a housing 21, a first movable member 22, and a second movable member 23.

Figure 3:
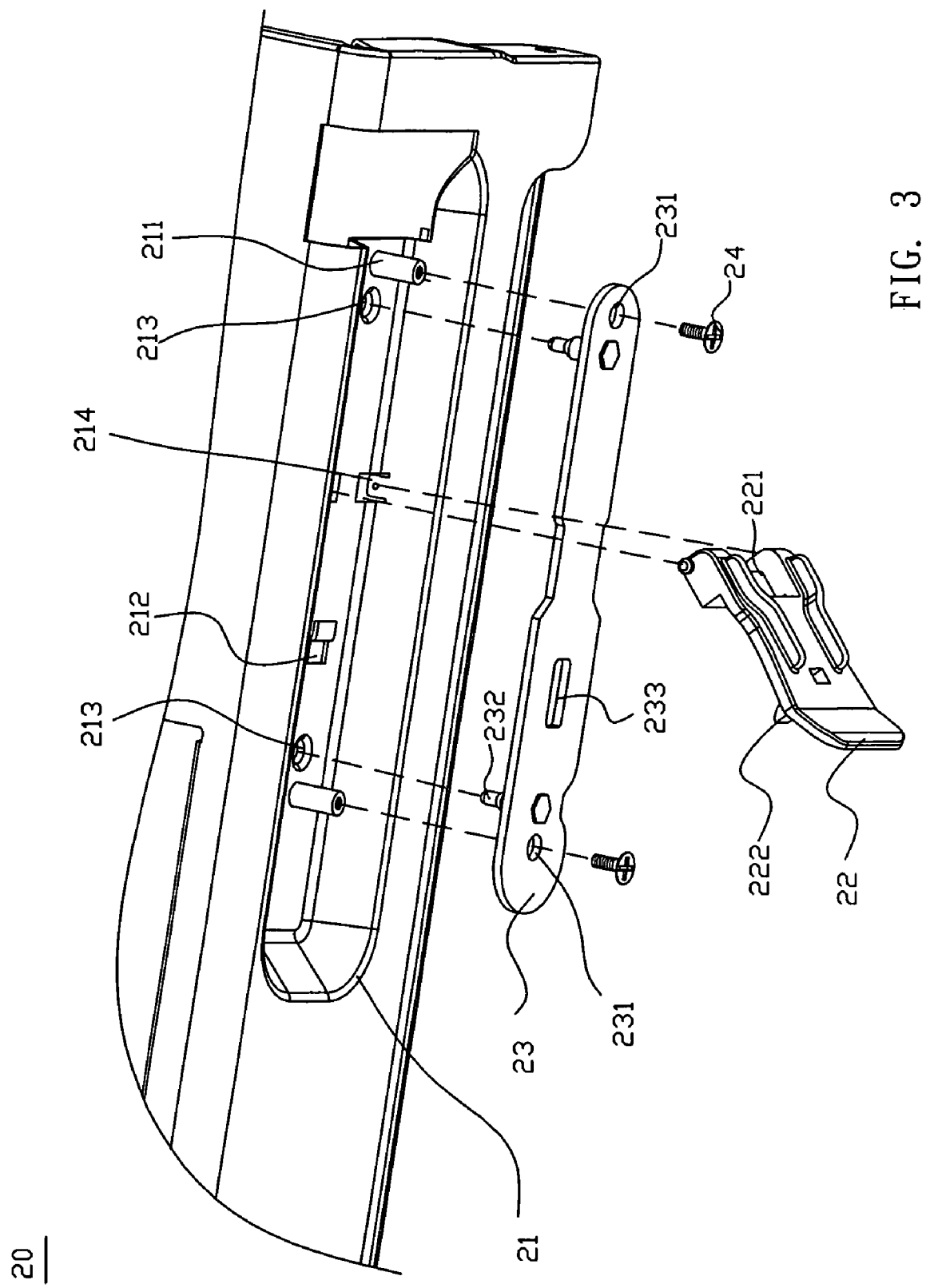
FIG. 3 is an enlarged schematic diagram showing the fixing structure for a detachable electronic assembly according to the preferred embodiment of the invention.

Please refer to FIG. 2 and FIG. 3, the housing includes at least one guiding bar 211, at least one first connecting portion 212, and a first opening 213 corresponding to the first hole 311.

Figure 4:
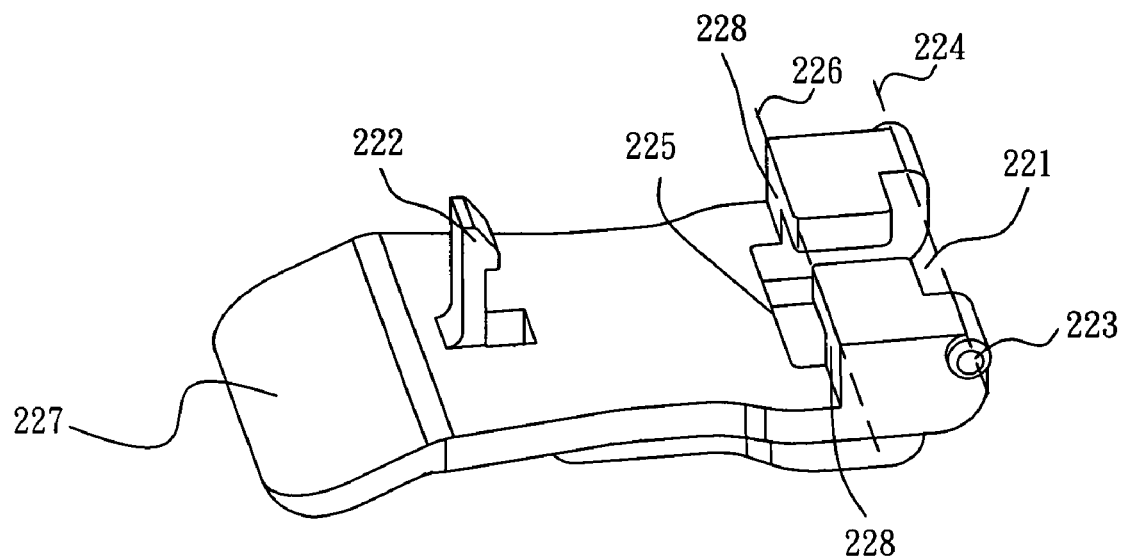
FIG. 4 is a schematic diagram showing a first movable member of the fixing structure for a detachable electronic assembly according to the preferred embodiment of the invention.

As shown in FIG. 3 and FIG. 4, the first movable member 22 has a second opening 221 and a second connecting portion 222. The first movable member 22 is pivotally connected with the housing 21. The second connecting portion 222 can be connected with the first connecting portion 212, and can be formed integrally with the first movable member 22.

Figure 5:
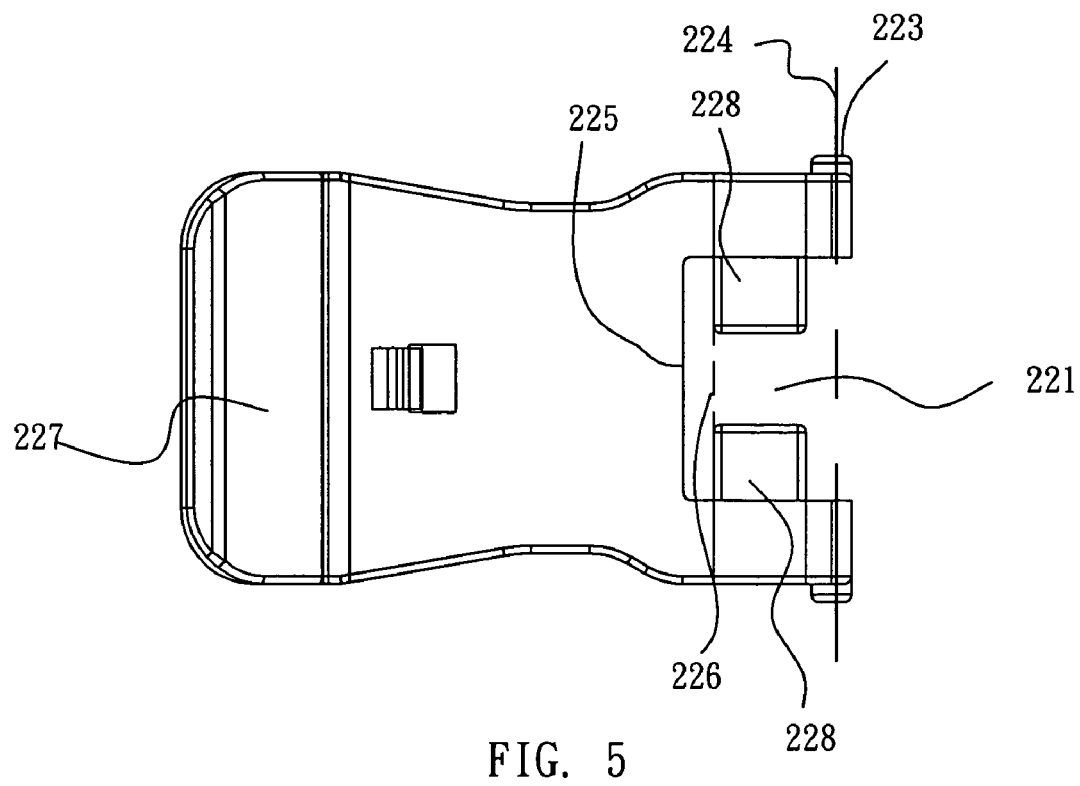
FIG. 5 is another schematic diagram showing the first movable member of the fixing structure for a detachable electronic assembly according to the preferred embodiment of the invention.

Please refer to FIG. 3 and FIG. 5. In the present embodiment, the first movable member 22 further includes at least one pivot member 223. The first movable member 22 pivots using the pivot member 223 as a rotation axis 224. The second opening 221 includes a first side 225 and a second side 226, which sides are substantially parallel to the rotation axis 224. The distance between the first side 225 and the pivot member 223 is larger than that between the second side 226 and the pivot member 223. The housing 21 further has a receiving portion 214 to receive the pivot member 223.

Moreover, the first movable member 22 may further include a bent portion 227 provided on the opposite side of the pivot member 223 to facilitate the operation of the user.

Figure 6:
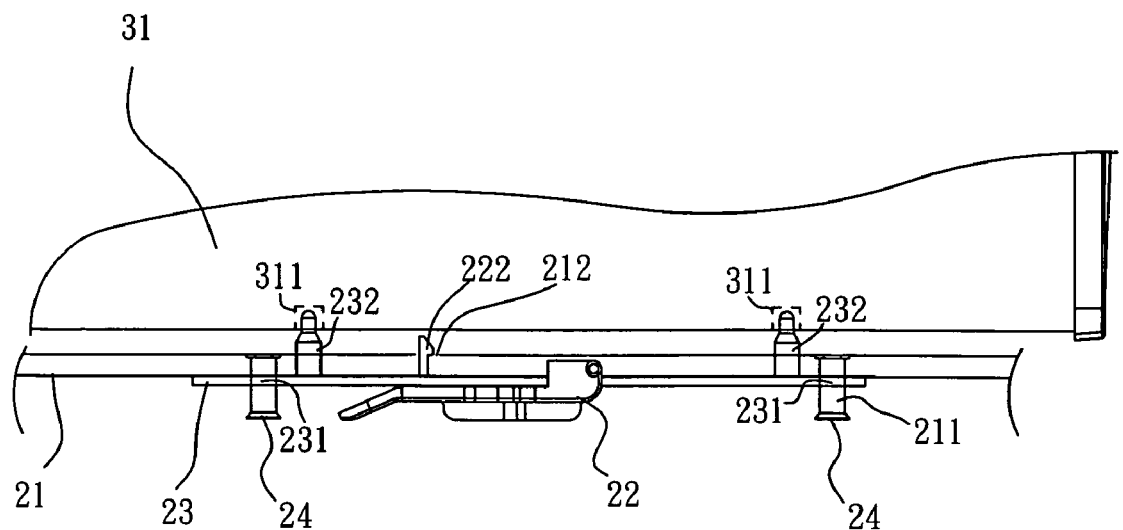
FIG. 6 is a sectional schematic diagram showing the fixing structure for the detachable electronic assembly and the apparatus in a fixed state.

Please refer to FIG. 3, FIG. 5 and FIG. 6, the second movable member 23 has a third opening 231 and a protrusion 232. A part of the second movable member 23 passes through the second opening 221, and the guiding bar 211 passes through the third opening 231. When the first movable member 22 pivots, the second movable member 23 moves along the guiding bar 211, and the protrusion 232 is inserted into the first opening 213 and the first hole 311 to fix the detachable electronic assembly 31.

The protrusion 232 can be formed integrally with the second movable member 23 as one piece, or can be fixed on the second movable member 23 by casting or screwing.

Please refer to FIG. 3 and FIG. 6, in the present embodiment, the second movable member 23 further includes a fourth opening 233. The second connecting portion 222 passes through the fourth opening 233 and is locked with the first connecting portion 212.

Figure 7:
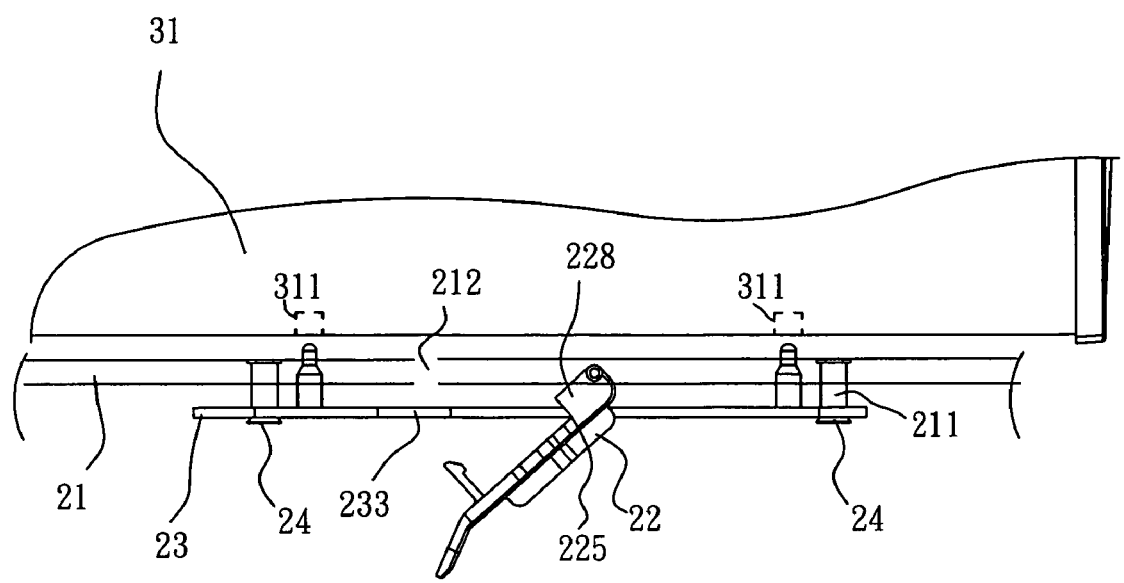
FIG. 7 is a sectional schematic diagram showing the fixing structure for the detachable electronic assembly and the apparatus in a released state.

In the present embodiment, as shown in FIG. 3, the fixing structure 20 further includes a stopper 24. The stopper 24 is provided at an end of the guiding bar 211 to limit the second movable member 23 to move between the housing 21 and the stopper 24 (as shown in FIG. 6 and FIG. 7). The stopper 24 can be either formed integrally on the guiding bar 211 and riveted on the housing 21, or screwed on the guiding bar 211 as in the present embodiment.

As shown in FIG. 5 to FIG. 7, to fix the detachable electronic assembly 31, the first movable member 22 is rotated to make the second connecting portion 222 become closer to the housing 21. The first side 225 pushes the second movable member 23, and makes the second movable member 23 to approach the housing 21. The detachable electronic assembly 31 is fixed after the protrusion 232 is inserted into the first hole 311.

Please refer to FIG. 5. In the present embodiment, the first movable member 22 further includes at least one guiding portion 228 provided adjacent to the second side 226.

As shown in FIG. 5 and FIG. 7, to release the detachable electronic assembly 31 from the housing 21, the first movable member 22 is rotated to move the second connecting portion 222 away from the housing 21. The guiding portion 228 pushes the second movable member 23, and makes the second movable member 23 move away from the housing 21. The detachable electronic assembly 31 is released from the housing 21 after the protrusion 232 is pulled out from the first hole 311.

The electronic apparatus 3 having the fixing structure according to the preferred embodiment of the invention will be described below with reference to FIG. 2 to FIG. 7.

As shown in FIG. 2, an electronic apparatus 3 having the fixing structure 20 includes a detachable electronic assembly 31, a housing 21, a first movable member 22, and a second movable member 23. The detachable electronic assembly 31 has at least one first hole 311, and can be a hard disk drive, an optical disk drive, or any computer system component. In the present embodiment, the detachable electronic assembly 31 is a hard disk drive.

In the present embodiment, the housing 21, the first movable member 22 and the second movable member 23 constitute the fixing structure 20 mentioned in the previous embodiment.

Please refer to FIG. 2 and FIG. 3, the housing 21 includes at least one guiding bar 211, at least one first connecting portion 212, and a first opening 213 corresponding to the first hole 311.

As shown in FIG. 3 and FIG. 4, the first movable member 22 has a second opening 221 and a second connecting portion 222. The first movable member 22 is pivotally connected with the housing 21. The second connecting portion 222 can be connected with the first connecting portion 212, and can be formed integrally with the first movable member 22.

Please refer to FIG. 3 and FIG. 5. In the present embodiment, the first movable member 22 further includes at least one pivot member 223. The first movable member 22 pivots using the pivot member 223 as a rotation axis 224. The second opening 221 includes a first side 225 and a second side 226, which sides are substantially parallel to the rotation axis 224. The distance between the first side 225 and the pivot member 223 is larger than that between the second side 226 and the pivot member 223. The housing 21 further has a receiving portion 214 to receive the pivot member 223.

Moreover, the first movable member 22 may further include a bent portion 227 provided on the opposite side of the pivot member 223 to facilitate the operation of the user.

Please refer to FIG. 3, FIG. 5 and FIG. 6, the second movable member 23 has a third opening 231 and a protrusion 232. A part of the second movable member 23 passes through the second opening 221, and the guiding bar 211 passes through the third opening 231. When the first movable member 22 pivots, the second movable member 23 moves along the guiding bar 211, and the protrusion 232 is inserted into the first opening 213 and the first hole 311 to fix the detachable electronic assembly 31.

The protrusion 232 can be formed integrally with the second movable member 23 as one piece, or can be fixed on the second movable member 23 by casting or screwing.

In the present embodiment, the second movable member 23 further includes a fourth opening 233. The second connecting portion 222 passes through the fourth opening 233 and is locked with the first connecting portion 212. The first connecting portion 212 may be a through hole, and the second connecting portion 222 may be a hook. The second connecting portion 222 connects with the first connecting portion 212 after passing through the fourth opening 233.

As shown in FIG. 3, the electronic apparatus 3 further includes a stopper 24. The stopper 24 is provided at an end of the guiding bar 211 to limit the second movable member 23 to move between the housing 21 and the stopper 24 (as shown in FIG. 6 and FIG. 7). The stopper 24 can be either formed integrally on the guiding bar 211 and riveted on the housing 21, or screwed on the guiding bar 211 as in the present embodiment.

As shown in FIG. 5 to FIG. 7, to fix the detachable electronic assembly 31, the first movable member 22 is rotated to make the second connecting portion 222 approach the housing 21. The first side 225 pushes the second movable member 23, and makes the second movable member 23 approach the housing 21. The detachable electronic assembly 31 is fixed after the protrusion 232 is inserted into the first hole 311.

Please refer to FIG. 5. In the present embodiment, the first movable member 22 further includes at least one guiding portion 228 provided adjacent to the second side 226.

As shown in FIG. 5 and FIG. 7, to release the detachable electronic assembly 31, the first movable member 22 is rotated to move the second connecting portion 222 away from the housing 21. The guiding portion 228 pushes the second movable member 23, and makes the second movable member 23 to move away from housing 21. The detachable electronic assembly 31 is released from the housing 21 after the protrusion 232 is pulled out from the first hole 311.

To sum up, according to the embodiments of the invention, the fixing structure moves the second movable member by rotating the first movable member. When the first movable member rotates, the protrusion on the second movable member fixes the electronic assembly to the housing or releases the electronic assembly from the housing. Since no screw is needed, the assembly time and material costs are both reduced. Furthermore, since the second connecting portion on the first movable member is used to connect with the first connecting portion on the housing, the fix and release operation of the user is easier and more convenient. Furthermore, the first movable member and the second movable member are connected directly or indirectly, or are limited to move on the housing, therefore the user does not have to worry about not being able to fix detachable electronic assembly due to part missing.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A fixing structure for fixing a detachable electronic assembly, the detachable electronic assembly having at least one first hole, the fixing structure comprising:
   a housing having at least one guiding bar, at least one first connecting portion, and a first opening corresponding to the first hole;
   a first movable member having a second opening and a second connecting portion, wherein the first movable member is pivotally connected with the housing, and the second connecting portion is locked with the first connecting portion; and
   a second movable member having a third opening and a protrusion, wherein a part of the second movable member passes through the second opening, the guiding bar passes through the third opening, and the second movable member moves along the guiding bar by the rotation of the first movable member so that the protrusion is inserted into the first opening and the first hole.

2. The fixing structure according to claim 1, wherein the first movable member further comprises at least one pivot member, the first movable member uses the pivot member as a rotation axis, the second opening has a first side and a second side, the first side and the second side are substantially parallel to the rotation axis, and the distance between the first side and the pivot member is larger than the distance between the second side and the pivot member.

3. The fixing structure according to claim 1, further comprising:
   a stopper disposed at an end of the guiding bar to limit the second movable member to move between the housing and the stopper.

4. The fixing structure according to claim 1, wherein the second movable member further comprises a fourth opening, and the second connecting portion passes through the fourth opening and is locked with the first connecting portion.

5. The fixing structure according to claim 2, wherein when the first movable member is rotated to make the second connecting portion approach the housing, the first side pushes the second movable member to make the second movable member approach the housing so that the protrusion is inserted into the first hole.

6. The fixing structure according to claim 2, wherein the first movable member further comprises at least one guiding portion, the guiding portion is disposed adjacent to the second side, and when the first movable member is rotated to move the second connecting portion away from the housing, the guiding portion pushes the second movable member to make the second movable member move away from the housing so that the protrusion is pulled out from the first hole.

7. The fixing structure according to claim 2, wherein the first movable member further comprises a bent portion disposed at a side opposite to the pivot member.

8. The fixing structure according to claim 1, wherein the protrusion comprises a screw component.

9. The fixing structure according to claim 2, wherein the housing has at least one receiving portion to receive the pivot member.

10. The fixing structure according to claim 1, wherein the first connecting portion is a through hole.

11. An electronic apparatus with a fixing structure, comprising:
   a detachable electronic assembly having at least one first hole;
   a housing having at least one guiding bar, at least one first connecting portion, and a first opening corresponding to the first hole;
   a first movable member having a second opening and a second connecting portion, wherein the first movable member is pivotally connected with the housing, and the second connecting portion is locked with the first connecting portion; and
   a second movable member having a third opening and a protrusion, wherein a part of the second movable member passes through the second opening, the guiding bar passes through the third opening, and the second movable member moves along the guiding bar by the rotation of the first movable member so that the protrusion is inserted into the first opening and the first hole.

12. The electronic apparatus according to claim 11, wherein the first movable member further comprises at least one pivot member, the first movable member uses the pivot member as a rotation axis, the second opening has a first side and a second side, the first side and the second side are substantially parallel to the rotation axis, and the distance between the first side and the pivot member is larger than the distance between the second side and the pivot member.

13. The electronic apparatus according to claim 11, further comprising:
a stopper disposed at an end of the guiding bar to limit the second movable member to move between the housing and the stopper.

14. The electronic apparatus according to claim 11, wherein the second movable member further comprises a fourth opening, and the second connecting portion passes through the fourth opening and is locked with the first connecting portion.

15. The electronic apparatus according to claim 11, wherein when the first movable member is rotated to make the second connecting portion approach the housing, the first side pushes the second movable member to make the second movable member approach the housing so that the protrusion is inserted into the first hole.

16. The electronic apparatus according to claim 12, wherein the first movable member further comprises at least one guiding portion, the guiding portion is disposed adjacent to the second side, and when the first movable member is rotated to move the second connecting portion away from the housing, the guiding portion pushes the second movable member to make the second movable member move away from the housing so that the protrusion is pulled out from the first hole.

17. The electronic apparatus according to claim 12, wherein the first movable member further comprises a bent portion disposed at a side opposite to the pivot member.

18. The electronic apparatus according to claim 11, wherein the protrusion comprises a screw component.

19. The electronic apparatus according to claim 12, wherein the housing has at least one receiving portion to receive the pivot member.

20. The electronic apparatus according to claim 11, wherein the first connecting portion is a through hole.

* * * * *